H. W. SHONNARD.
DISTANCE GEAR FOR AUTOMOBILE TORPEDOES.
APPLICATION FILED OCT. 27, 1916.
1,296,328.
Patented Mar. 4, 1919.
3 SHEETS—SHEET 1.
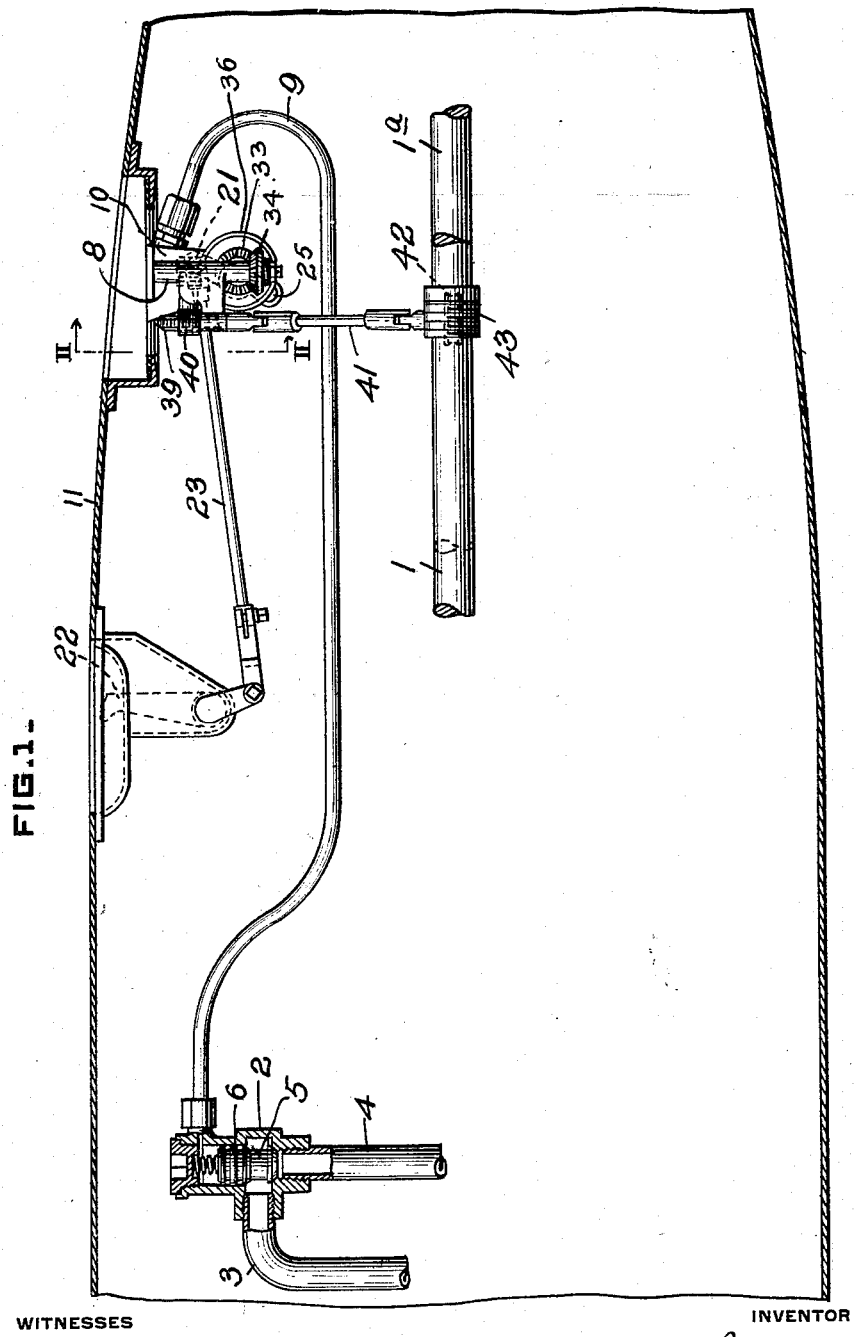

H. W. SHONNARD.
DISTANCE GEAR FOR AUTOMOBILE TORPEDOES.
APPLICATION FILED OCT. 27, 1916.
1,296,328.
Patented Mar. 4, 1919.
3 SHEETS—SHEET 2.
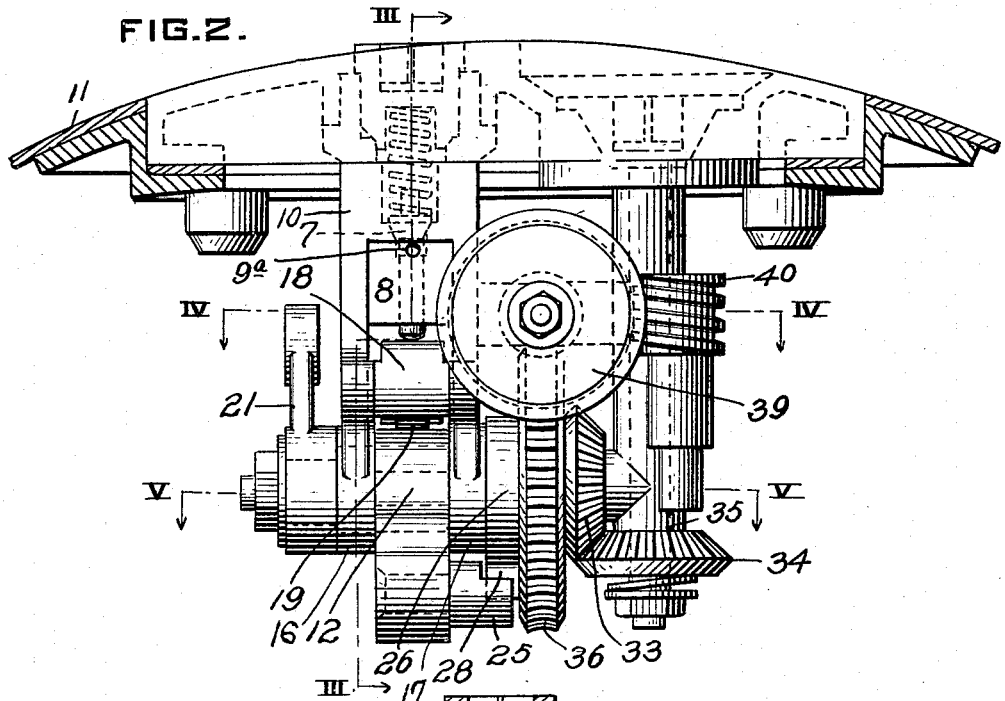
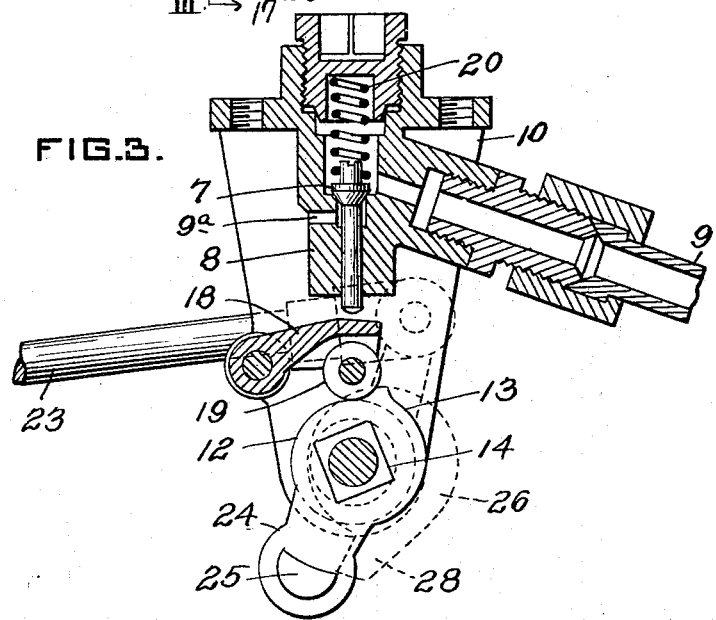
WITNESSES
J. Herbert Bradley.
Paul M. Critchlow
INVENTOR
Harold W. Shonnard
by Christy and Christy
his attorneys

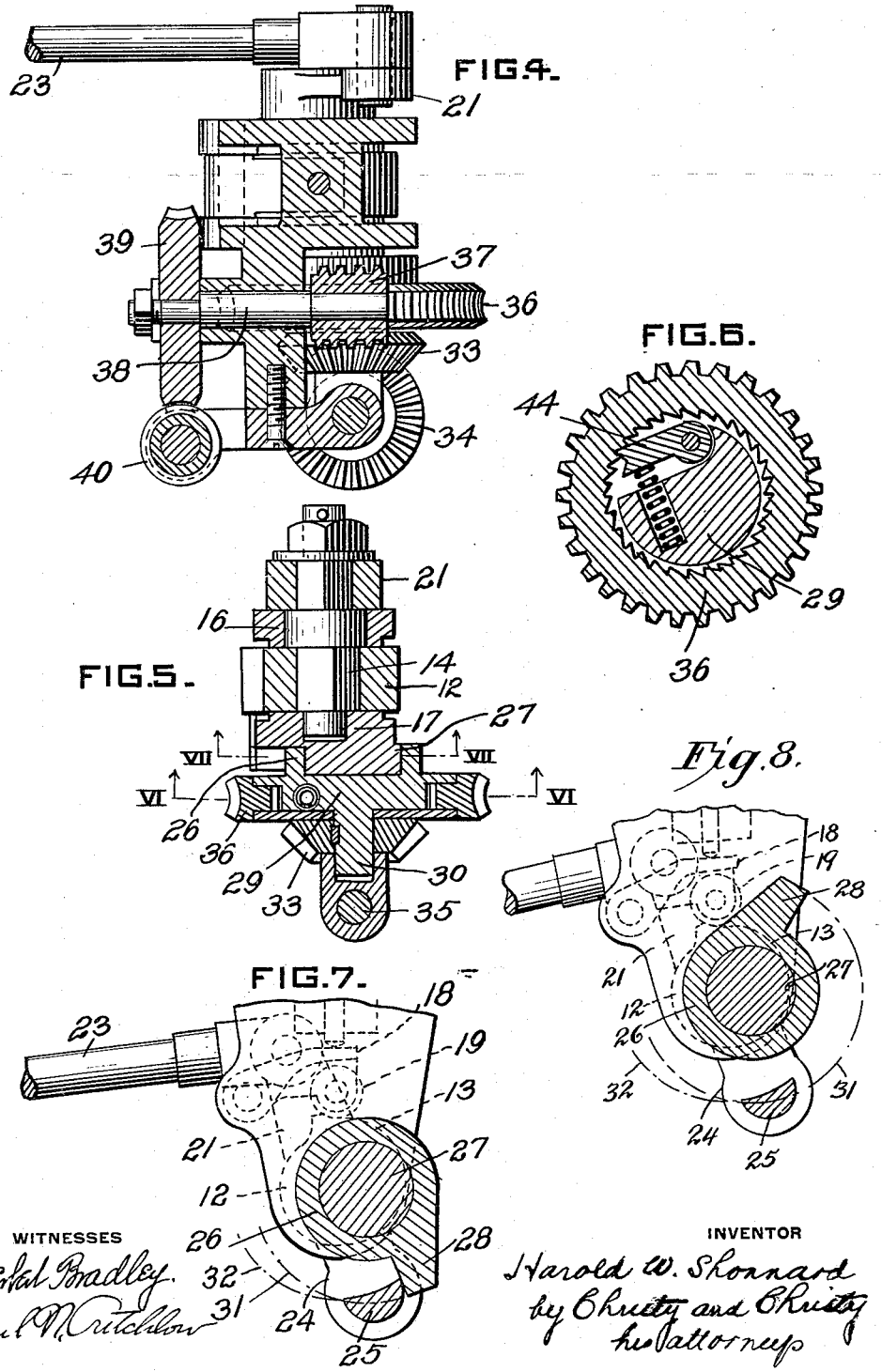

UNITED STATES PATENT OFFICE.

HAROLD W. SHONNARD, OF UPPER MONTCLAIR, NEW JERSEY, ASSIGNOR TO CRUCIBLE STEEL COMPANY OF AMERICA, OF PITTSBURGH, PENNSYLVANIA, A CORPORATION OF NEW JERSEY.

DISTANCE-GEAR FOR AUTOMOBILE TORPEDOES.

1,296,328.

Specification of Letters Patent.

Patented Mar. 4, 1919.

Application filed October 27, 1916. Serial No. 128,083.

*To all whom it may concern:*

Be it known that I, HAROLD W. SHONNARD, residing at Upper Montclair, in the county of Essex and State of New Jersey, a citizen of the United States, have invented or discovered certain new and useful Improvements in Distance-Gear for Automobile Torpedoes, of which improvements the following is a specification.

My invention relates to automobile torpodoes, and has particularly to do with mechanism, usually known as distance gears, for stopping the torpedo propelling mechanism after the torpedo has traveled a desired predetermined distance. The object is to provide a positively acting distance gear which will be simple in construction, efficient in operation, and which may be quickly and easily set for any desired length of run.

In the accompanying sheets of drawings, which form part of my specification, I have illustrated the preferred embodiment of my invention. Figure 1 is a longitudinal sectional view of a portion of a torpedo showing the general arrangement of the distance gear and the parts connected to it; Fig. 2 a sectional view to enlarged scale taken on the line II—II, Fig. 1; Fig. 3 a detail sectional view taken on the line III—III, Fig. 2; Figs. 4 and 5 sectional views taken, respectively, on the lines IV—IV and V—V, Fig. 2; Figs. 6 and 7 sectional views taken, respectively, on the lines VI—VI and VII—VII, Fig. 5; and Fig. 8 is a view similar to Fig. 7 showing certain parts in different relative positions.

In the several figures like numerals are used to designate like parts.

In the practice of my invention, the distance gear which I provide for stopping the propelling mechanism of a torpedo accomplishes this end by controlling the flow of motive fluid to such mechanism. While the motive fluid may be controlled in various ways and at various points before it reaches the driving motor or engine, it is preferably controlled at the starting valve, the general arrangement to this end being shown in Fig. 1. In this figure the propelling mechanism is illustrated by the oppositely rotatable propelling shafts 1 and 1ª adapted to be driven by a turbine or other form of motor in a manner well known to those skilled in the art and not requiring illustration herein.

The starting valve is of a well known type comprising a casing 2 having its inlet connected to a pipe 3 leading from the compressed air reservoir and its outlet connected to a pipe 4 leading to a motive fluid generator or directly to the driving motor. Within the casing there is an unbalanced valve member 5 provided with a small port or by-pass 6 to permit compressed air to flow into the upper portion of the casing to hold the valve in closed position. For controlling the starting valve, and in turn the flow of motive fluid to the propelling mechanism, there is provided a controller in the form of a spring pressed bleeder valve consisting of a stem 7 and casing 8, Fig. 3, the casing 8 and the upper part of the starting valve casing 2 being connected by means of a pipe 9. The arrangement is such that, when the valve stem 7 is in closed position, the compressed air acting on the top of the valve 5 will hold it seated, and that, when the stem 7 is in open position the compressed air from the top of the valve 5 will escape through a port 9ᴬ in the casing 8, thus permitting the valve 5 to open by reason of the unbalanced pressure on it.

The distance gear which I provide comprises a single member for moving the stem 7 to open position and holding it in such position, a driven member adapted to move said first named member to release the stem 7, and a driver for moving the driven member. The driver is operatively connected to the torpedo propelling mechanism so that it moves continuously when such mechanism is in operation, and there is a clutch between the driver and driven member so constructed that the driver and driven member will move in unison when the driver is moved in but one direction.

Referring to the embodiment of the invention illustrated in the drawings, all the parts of the distance gear are conveniently mounted in a frame 10 secured to the torpedo body 11. The member for moving the stem 7 to open position consists of a cam 12—13 secured to a spindle 14 rotatably mounted in bearings 16 and 17 of the frame 10. The movement of the stem 7 by the cam is effected indirectly through a finger 18 pivoted to the frame 10 and provided with a roller 19 adapted to rest on the cam. When the cam is in the position indicated in Fig.

3, the roller 19 resting on the face 12, the stem 7 is held in closed position under the action of a spring 20 and the pressure of the air on the top of the stem. When in the alternate position indicated in Fig. 7, the roller resting on the cam face 13, the valve stem is held in open position, and it will be understood that the movement of the cam from the first to the second position causes the stem to move from closed to open valve position. Secured to the spindle 14 and movable with the cam, there is an arm 21 connected to a trip finger 22 by means of a rod 23, the arrangement being such that when the finger 22 is moved to the right, as viewed in Fig. 1, the cam will raise the stem 7, thus effecting the opening of the starting valve in the manner already explained. For the purpose of engaging the cam for moving it to release the stem 7 and thus cut off the supply of motive fluid, the cam is provided with an arm 24 having a laterally extending dog 25.

As already indicated, a driven member is provided to move the cam to valve-releasing position, and a driver coördinated with the propelling mechanism for moving the driven member. The driven member, as best seen in Figs. 5, 6 and 7, is an integral structure consisting of a collar 26 rotatably mounted on a hub 27 of the frame 10, a finger 28 projecting radially from the collar, a disk 29 at one side of the collar, and a stem 30 extending laterally from the disk. The arrangement is such that, upon the rotation of the driven member, the finger 28 thereof engages the dog 25 of the cam member and moves such member with it. To the end that the driven member may, after the cam has been turned sufficiently to release the valve stem 7, continue to rotate, the axis of rotation of the driven member is arranged eccentric to but parallel with that of the cam. Thus, when rotated, the tip of the finger 28 moves in an arc indicated by the line 31, and the inner edge of the dog 25 on an arc indicated by the line 32, it being readily apparent that beyond the point of intersection of these arcs the driven member may continue to move without carrying with it the cam member.

Two means are provided for moving the driven member, the one a manually operable means for turning it in a clockwise direction, as viewed in Fig. 7, so that the finger may be set at a desired interval from the dog 25, and the other, already referred to as a driver, coördinated with the propelling mechanism to move the driven member into engagement with the dog 25. The former, as shown herein, consists of a pinion 33 keyed to the stem 30 of the driven member, and a pinion 34 keyed to a shaft 35 and meshing with the pinion 33. The outer end of the shaft 35 projects through the torpedo body and is provided with a wrench socket for turning it. The driver consists of a worm gear 36 mounted on the periphery of the disk 26 of the driven member and provided on its outer face with teeth meshing with a worm 37. The driving connection between this worm and the propelling shaft comprises a shaft 38, worm gear 39, worm 40, coupling rod 41, worm gear 42, and worm 43 secured to a propelling shaft.

While various forms of clutches may be used between the driver and driven member to the end that the driver will move the driven member when the propelling mechanism is in operation and that the driven member may, without moving the driver, be set as already explained, a pawl and ratchet clutch is preferably employed. As shown in Fig. 6, a spring pressed pawl 44 is pivotally mounted in a suitably formed recess in the disk portion 29 of the driven member, and the worm gear 36 is provided interiorly with ratchet teeth.

The operation will now be explained. Before launching the torpedo the finger 28 of the driven member of the distance gear is turned so that it is spaced at the desired interval from the dog 25 of the cam member, it being understood that the greater the space interval between such finger and dog the longer will be the travel of the torpedo. The setting of this finger is effected by turning the shaft 35, which, through pinions 34 and 33, rotates the driven member in clockwise direction as viewed in Figs. 6, 7 and 8, Fig. 8 showing the finger in a starting position. Prior to the launching of the torpedo the cam member 12—13 of the distance gear is in the position indicated in Fig. 3, that is to say the roller 19 of the finger 18 rests upon the face 12 of the cam, thus permitting the valve stem to be in closed position. Upon the launching of the torpedo the starting latch 22 is tripped, and, through rod 23 and arm 21, the cam member is moved to the position indicated in Fig 7, the valve stem being thus raised and held in open valve position so that the starting valve 5 may open and remain open to permit air to flow to the propelling motor. Through the driving connections already explained one of the propelling shafts turns the worm gear 36 of the distance gear, and the driver, through the pawl and ratchet clutch, turns the driven member. When the propeller shafts have made the required number of revolutions to bring the finger 28 of the driven member from the position indicated in Fig. 8 into engagement with the dog 25 of the cam member as shown in Fig. 7, the cam member is turned by the further movement of this finger to the position indicated in Fig. 3, and in such position of the cam the valve stem 7 is permitted to close with the result that the starting valve will close and the motive fluid be shut off from the propelling engine. Finally the further rotation of the propelling mechanism, due to its acquired momentum, causes the finger 28 to move beyond its range of engagement with the dog 25, as indicated by the arcs 31 and 32 in Fig. 7.

According to the provisions of the patent statute I have described the principle and operation of my invention together with mechanism which I now consider to represent the best embodiment thereof. However, I desire to have it understood that the invention may be practised by other forms of mechanism than that shown and described herein.

I claim as my invention:

1. In an automobile torpedo, the combination with propelling mechanism therefor, of a distance gear comprising a motive fluid controller held yieldingly in closed position, a single member for moving said controller to and holding it in open position, and means coördinated with the propelling mechanism for releasing said member.

2. In an automobile torpedo, the combination with propelling mechanism therefor, of a distance gear comprising a motive fluid controlling valve held yieldingly in closed position, a movable cam effective when moved to one position to open said valve and when in such position to hold it open, and means coördinated with the propelling mechanism for moving said cam to release said valve.

3. In an automobile torpedo, the combination with propelling mechanism therefor, of a distance gear comprising a motive fluid controller, a rotatable driven member for operating said controller, a rotatable driver for moving said driven member, operative connections between said driver and the propelling mechanism, and a clutch between said driver and driven member effective to cause said parts to move in unison when the driver is turned in but one direction.

4. In an automobile torpedo, the combination with propelling mechanisms therefor, of a distance gear comprising a motive fluid controller, a driven member for operating said controller, a driver for moving said driven member, operative connections between said driver and the propelling mechanisms, and pawl and ratchet connections between said driver and driven member.

5. In an automobile torpedo, the combination with propelling mechanism therefor, of a distance gear comprising a motive fluid controller, a rotatable driven member for operating said controller, a rotatable driver for moving said driven member, operative connections between said driver and the propelling mechanism, and pawl and ratchet connections between said driver and driven member.

6. In an automobile torpedo, the combination with propelling mechanism therefor, of a distance gear comprising a motive fluid controller, a rotatable driven member for operating said controller, a driver rotatable on an axis eccentric to but parallel with that of said driven member whereby said driver after having moved said driven member may move farther without moving said driven member, operative connections between said driver and the propelling mechanism, and a clutch between said driver and driven member effective to cause said parts to move in unison when the driver is turned in but one direction.

In testimony whereof I have hereunto set my hand.

HAROLD W. SHONNARD.

Witnesses:
 GEO. V. JAMES,
 L. W. HASKINS.

Copies of this patent may be obtained for five cents each, by addressing the "Commissioner of Patents, Washington, D. C."